US006548032B1

(12) United States Patent
Barthe et al.

(10) Patent No.: US 6,548,032 B1
(45) Date of Patent: Apr. 15, 2003

(54) PROCESS FOR THE TREATMENT OF GASES WITH HIGH OXYGEN CONTENT, WITH A VIEW TO CONTROLLING NITROGEN OXIDE EMISSIONS, USING A CATALYTIC COMPOSITION COMPRISING CERIUM OXIDE AND/OR ZIRCONIUM OXIDE

(75) Inventors: Philippe Barthe, Saint-Martin-du-Terre (FR); Catherine Hedouin, Gouvieux (FR); Thierry Seguelong, Puteaux (FR)

(73) Assignee: Rhodia Chimie, Boulogne Billancourt Cedex (FR)

( * ) Notice: Subject to any disclaimer, the term of this patent is extended or adjusted under 35 U.S.C. 154(b) by 13 days.

(21) Appl. No.: 09/834,418

(22) Filed: Apr. 13, 2001

Related U.S. Application Data

(63) Continuation of application No. 09/029,850, filed on Aug. 28, 1998, now abandoned.

(30) Foreign Application Priority Data

Sep. 20, 1995 (FR) ............................................. 95 11020

(51) Int. Cl.⁷ ............................................... B01D 53/56
(52) U.S. Cl. ................................ 423/213.2; 423/213.5; 423/213.7; 423/235

(58) Field of Search .......................... 423/213.2, 213.5, 423/213.7, 235; 502/304, 324

(56) References Cited

U.S. PATENT DOCUMENTS

| | | | |
|---|---|---|---|
| 4,003,976 A | 1/1977 | Komatsu | 423/213.5 |
| 4,299,734 A | 11/1981 | Fujitani | |
| 4,927,799 A | 5/1990 | Matsumoto | 502/303 |
| 5,063,193 A | 11/1991 | Bedford | 502/304 |
| 5,362,463 A | 11/1994 | Stiles | 423/239.1 |
| 5,439,868 A | 8/1995 | Onitsuka | 502/415 |
| 5,457,958 A | 10/1995 | Boegner | 60/279 |

*Primary Examiner*—Stanley S. Silverman
*Assistant Examiner*—Maribel Medina

(57) ABSTRACT

The invention relates to a process for the treatment of gases with high oxygen content, with a view to controlling nitrogen oxide emissions, characterized in that use is made of a catalytic composition comprising manganese oxide and at least one oxide chosen from cerium oxide and zirconium oxide. This composition may furthermore comprise at least one other element chosen from those in groups VIII, IB, IVB and VB. The process of the invention applies in particular to the treatment of exhaust gases of internal-combustion engines, more particularly diesel engines or lean-burn engines.

8 Claims, No Drawings

PROCESS FOR THE TREATMENT OF GASES WITH HIGH OXYGEN CONTENT, WITH A VIEW TO CONTROLLING NITROGEN OXIDE EMISSIONS, USING A CATALYTIC COMPOSITION COMPRISING CERIUM OXIDE AND/OR ZIRCONIUM OXIDE

This application is a continuation application of application No. 09/029,850 filed on Aug. 28, 1998 abandoned.

The present invention relates to a process for the treatment of gases, in particular exhaust gases of internal-combustion engines, with high oxygen content, with a view to controlling nitrogen oxide emissions.

It is known that the emissions of nitrogen oxides (NOx) in exhaust gases of motor-vehicle engines, in particular, are controlled using three-way catalysts which use stoichiometrically the reducing gases present in the mixture. Any excess of oxygen results in a drastic reduction in the performance of the catalyst.

Moreover, some engines, such as diesel engines or lean-burn petrol engines, are economical in terms of fuel but emit exhaust gases which continuously contain a large excess of oxygen, for example at least 5%. A standard three-way catalyst therefore has no effect on the NOx emissions of these engines. Furthermore, limiting the NOx emissions has become an imperative requirement because of the tightening of motor-vehicle afterburn standards, which are now extended to this type of engine.

Therefore there is a real need for an effective catalytic converter to control NOx emissions for this type of engine, and more generally to treat this type of gas.

The object of the invention is therefore to find a catalytic converter which can be used for the treatment of exhaust gases with high oxygen content.

To this end, the method according to the invention, for the treatment of gases with high oxygen content, with a view to controlling nitrogen oxide emissions, is characterized in that use is made of a catalytic composition comprising manganese oxide and at least one oxide chosen from cerium oxide and zirconium oxide.

The invention furthermore relates to a catalytic system for the same treatment of the same type of gas, which is characterized in that it comprises a catalytic composition of the above type.

Finally, the invention relates to a process for the preparation of such a catalytic system, which is characterized in that use is made of a catalytic composition as mentioned above.

Other characteristics, details and advantages of the invention will emerge yet more fully on reading the following description, as well as various concrete but non-limiting examples intended to illustrate it.

As indicated above, the catalytic composition used in the scope of the present invention comprises manganese oxide and at least one oxide chosen from cerium oxide and zirconium oxide.

This composition may furthermore contain an additional element, which is also generally present in oxide form in the composition. This element may be chosen from those in groups VIII, IB, IVB and VB.

The Periodic Table of the Elements to which reference is made is the one published in "le Supplément au Bulletin de la Société chimique de France" [Supplement to the Journal of the Chemical Society of France] No. 1 (January 1966).

All elements in group IB are suitable in the scope of the present invention. Tin may more particularly be mentioned in the case of group IVB, and antimony and bismuth in the case of group VB.

As regards cerium and zirconium, use is preferably made of an oxide suitable for catalysis applications, that is to say an oxide capable, in particular, of retaining a sufficient specific surface at elevated temperature.

By way of example, mention may be made of the cerium oxides described in French patent applications FR-A-2559754 and FR-A-2640954.

Manganese is present in a quantity, expressed as atomic manganese content relative to the number of moles of cerium oxide and zirconium oxide, which is preferably at most 50%. This content may, more particularly, be at most 20%. The minimum manganese content is usually at least 0.5%. The manganese content is generally between 5 and 20%.

The respective proportions of cerium and zirconium are arbitrary. The other element or elements is/are present in a quantity, expressed as atomic element content relative to the number of moles of cerium oxide and zirconium oxide, which is preferably at most 20% and, in particular, at most 10%. This content may more particularly be at most 5%.

With regard to the method of using manganese and the other element or elements with cerium and/or zirconium, there are several embodiments of the invention.

According to a first embodiment, the cerium and/or zirconium may constitute a support onto which the manganese, and optionally at least one aforementioned additional element, is deposited.

According to a second embodiment, the cerium and/or zirconium, with the manganese, may constitute a support onto which at least one element of the aforementioned type is deposited.

According to a variant of the invention, the cerium and/or zirconium, with the manganese, are present in the form of a solid solution. This variant is particularly applicable to the case in which the cerium and/or zirconium, with the manganese, all form the support of the composition. The term "solid solution" is intended to mean that the X-ray diffraction spectra of the cerium and/or zirconium/manganese mixture actually reveal the existence, within the latter, of only one single identifiable phase (absence of a detectable parasitic secondary phase), this phase corresponding, for example in the case of a mixture containing only cerium, to that of a ceric oxide which is crystallized in the cubic system and whose lattice parameters are to some extent shifted relative to a pure ceric oxide, thus manifesting the fact that manganese is incorporated in the crystal lattice of the cerium oxide, and therefore that a true solid solution is obtained.

The compositions which can be used in the scope of the present invention may be prepared in various ways. Various methods will be given below without implying any limitation.

According to a first method, the following operations are carried out:

a mixture in a liquid medium is prepared, containing a cerium and/or zirconium compound and a manganese compound;
the said mixture is heated;
the precipitate thus obtained is recovered;
the said precipitate is calcined.

The first operation therefore consists in preparing a mixture in a liquid medium, generally in the aqueous phase, containing at least one cerium and/or zirconium compound and a manganese compound. These compounds are preferably soluble compounds. The mixture may equally well be obtained either from compounds initially in the solid state, which will then be introduced into an aqueous stock solution, or directly from solutions of these compounds, then mixing the said solutions in an arbitrary order.

Water-soluble cerium compounds which may be mentioned are, in particular, cerium(IV) salts such as nitrates or cerium-ammonium nitrates, for example, which are particularly suitable in this case. Ceric nitrate is preferably used. The cerium(IV) salt solution may contain cerium in the cerous state without causing problems, but it is desirable for it to contain at least 85% of cerium(IV). An aqueous ceric nitrate solution may, for example, be obtained by reacting nitric acid with a hydrated ceric oxide prepared conventionally by reacting a solution of a cerous salt, for example cerous carbonate, with an ammonia solution in the presence of aqueous hydrogen peroxide solution. It is also possible, and preferable, to use a ceric nitrate solution obtained by the process of electrolytic oxidation of a cerous nitrate solution, as described in document FR-A-2 570 087, which here constitutes the starting material of choice.

It will be noted here that the aqueous solution of cerium (IV) salts may have some degree of initial free acidity, for example a normality varying between 0.1 and 4N. According to the present invention, it is possible both to use an initial cerium(IV) salt solution which actually has some degree of free acidity, as mentioned above, and to use a solution which has been neutralized beforehand to a greater or lesser extent by adding a base such as, for example, an ammonia solution or alkali metal (sodium, potassium, etc.) hydroxide solution, but preferably an ammonia solution, so as to limit this acidity. In the latter case, a degree of neutralization (r) of the initial cerium solution can then be practically defined by the following equation:

$$r = \frac{n3 - n2}{n1}$$

in which n1 represents the total number of moles of Ce(IV) present in the solution after neutralization; n2 represents the number of moles of OH$^-$ ions actually required to neutralize the initial free acidity provided by the aqueous cerium(IV) salt solution; and n3 represents the total number of moles of OH$^-$ ions provided by the addition of a base. When the "neutralization" variant is employed, use is in all cases made of a quantity of base which must necessarily be less than the quantity of base required to obtain complete precipitation of the hydroxide species Ce(OH)$_4$ (r=4). In practice, there will thus be a limitation to degrees of neutralization no greater than 1, and more preferably no greater than 0.5.

Salts of the zirconium sulphate, zirconyl nitrate or zirconyl chloride type may be mentioned as zirconium compounds.

Manganese compounds which may be used are, for example, the salts of inorganic or organic acids, for example of the sulphate, nitrate, chloride or acetate type. It will be noted that the nitrate is particularly suitable. These compounds may also be added in the form of sols. These sols can be obtained, for example, by neutralizing a salt of these compounds using a base.

The quantities of cerium and/or zirconium and manganese present in the mixture should correspond to the stoichiometric proportions required for obtaining the desired final composition.

Once the initial mixture has thus been obtained, it is then heated.

The temperature at which this heat treatment, also called theromhydrolysis, is carried out may be between 80° C. and the critical temperature of the reaction medium, in particular between 80 and 350° C., preferably between 90 and 200° C.

Depending on the temperature conditions adopted, this treatment can be carried out either under normal atmospheric pressure or under a pressure such as, for example, the saturated vapour pressure corresponding to the temperature of the heat treatment. When the treatment temperature is selected to be greater than the reflux temperature of the reaction mixture (that is to say generally greater than 100° C.), for example selected between 150 and 350° C., the operation is then carried out by introducing the aqueous mixture containing the aforementioned species into a closed chamber closed reactor more commonly referred to as an autoclave), the required pressure then being produced simply from the heating of the reaction medium (autogenous pressure). Under the temperature conditions given above, and in aqueous media, it may be specified by way of illustration that the pressure in the closed reactor varies between a value greater than 1 bar ($10^5$ Pa) and 165 bar ($165 \cdot 10^5$ Pa). It is, of course, also possible to exert an external pressure, which then adds to the pressure due to heating.

The heating can be carried out under an air atmosphere, or under an inert-gas atmosphere, preferably a nitrogen atmosphere.

The duration of the treatment is not critical, and can thus vary between wide limits, for example between 1 and 48 hours, preferably between 2 and 24 hours. Similarly, the temperature rise takes place at a rate which is not critical, and the fixed reaction temperature may thus be reached by heating the medium for, for example, between 30 minutes and 4 hours, these values being given simply as an indication.

After the heating step, a solid precipitate is recovered, which can be separated from its medium by any conventional solid/liquid separation technique such as, for example, filtration, settling, drying or centrifuging.

If necessary, a base such as, for example, an ammonia solution, may be introduced into the precipitation medium before and/or after the heating step.

Aqueous hydrogen peroxide solution, either on its own or in combination with the base, may also be added in the same way, before and/or after the heating step.

It will be noted that it is, of course, possible to repeat, one or more times and identically of differently, a heating/precipitation step as defined above, by then employing, for example, heat-treatment cycles.

The product as recovered can then be subjected to washes with water and/or with aqueous ammonia, at a temperature between room temperature and the boiling point. In order to eliminate the residual water, the washed product may finally be optionally dried, for example in air, at a temperature which may vary between 80 and 300° C., preferably between 100 and 150° C.

In a last step, the recovered precipitate, optionally after washing and/or drying, is then calcined. This calcination is carried out at a temperature generally of between 200 and 1200° C., preferably between 300 and 900° C. This calcination temperature must be sufficient to convert the precursors into oxides. For its part, the duration of the calcination may vary within wide limits, for example between 1 and 24 hours, preferably between 2 and 10 hours. The calcination is generally carried out under air, but calcination carried out, for example, under an inert gas is, of course, not ruled out.

Another method for the preparation of a composition which can be used in the present invention is characterized in that it comprises the following steps:

a mixture in liquid medium is prepared, containing a cerium and/or zirconium compound and a manganese compound;
a basic compound is introduced into the said mixture, by means of which the mixture is precipitated;
the precipitate thus obtained is recovered;
the said precipitate is calcined.

Everything mentioned above in the description of the first method for the preparation of the mixture in a liquid medium is application here as well.

However, it will added that it is also possible to use a cerium sol and/or a zirconium sol.

Cerium sole may be obtained by any suitable technique, in particular, but without limitation, according to the methods described in patent applications FR-A-2 583 735, FR-A-2 583 736, FR-A-2 583 737, FR-A-2 596 380, FR-A-2 596 382, FR-A-2 621 576 and FR-A-2 655 972, all of which are in the name of the Applicant Company, and the teachings of which are included herein by way of reference.

It is possible to employ cerium sols whose means size, as determined by quasi-elastic light scattering, may vary from 3 nm to 100 nm, preferably between 5 and 50 nm.

It is possible to use zirconium sols obtained, for example, by hot hydrolysis of a sulphuric zirconium solution, in a nitric medium or a hydrochloric medium, at a temperature of between 80 and 150° C. and preferably towards 90° C., the $SO_3/ZrO_2$ molar ratio of the sulphuric zirconium solution being preferably between 0.34 and 1, and its concentration varying preferably from 0.1 to 2 mol/l, expressed in terms of $ZrO_2$. The basic zirconium sulphate thus obtained is then neutralized with a base, preferably aqueous ammonia, until a pH of about 8 is obtained. It is then washed, and the gel obtained is then dispersed by adding a nitric acid solution, the pH of the dispersion medium then being preferred between 0.5 and 5.

It is possible to use zirconium sols having a mean size of between 5 nm and 500 nm, and advantageously between 10 and 200 nm.

It should be noted that it is also possible to start with cerous and manganese(II) salts. In this case, an oxidizing agent, such as aqueous hydrogen peroxide solution, is added to the starting mixture.

In the second step of this second method, a basic compound is introduced to the mixture previously obtained. Products of the hydroxide type may be used as the base or basic compound. Mention may be made of alkali metal or alkaline-earth metal hydroxides. Secondary, tertiary or quaternary amines may also be used. However, amines and aqueous ammonia may be preferred insofar as they reduce the risks of pollution by alkali metal or alkaline-earth metal cations. Mention may also be made of urea. The order in which the reactants are introduced is arbitrary, it being possible to introduce the basic compound into the mixture or vice versa, or alternatively the reactants may be introduced into the reactor simultaneously.

The addition may be carried out in a single stage, gradually or continuously, and it is preferably carried out with stirring. This operation may be carried out at a temperature of between room temperature (18–25° C.) and the reflux temperature of the reaction medium, it being possible for the latter to be up to 120° C., for example. It is preferably carried out at room temperature.

When the addition of the basic solution is finished, the reaction medium may optionally continue to be stirred for some time, in order to complete the precipitation.

After the precipitation step, a solid precipitate mass is recovered, which can be separated from its medium by any conventional technique.

The washing and calcination steps are then carried out in the same way as that described for the fist method.

With regard to both methods which have just been described, it may be noted that, as a variant, it is possible to omit the final step of calcination, and in this case only to carry out drying at a temperature of the order of 100° C.

A third possible method for the preparation of a composition which can be used in the scope of the present invention comprises the following steps:
a mixture in a liquid medium is prepared, which contains a cerium and/or zirconium sol and at least one manganese compound;
the mixture thus obtained is spray-dried;
the dried product is calcined.

As regards the first step in this third method, everything described above in this context for the preceding methods applies here too. It will be added that the manganese compound may optionally also be provided in the form of a sol.

The second step in this third method is spray-drying, that is to say drying by spraying the mixture in a hot atmosphere. The spraying may be carried out using any sprayer known per se, for example using a spray nozzle of the sprinkler rose or other type. Use may also be made of so-called turbine sprayers. With regard to the various spraying techniques which can be employed in the present process, mention may, in particularly, be made to the definitive work by Masters entitled "Spray-drying" (second edition, 1976, Pub. George Goodwin—London).

It will be noted that the spray-drying operation may also be employed by using a flash reactor, for example of the type developed by the Applicant Company and described, in particular, in patent applications FR-A-2 257 326, FR-A-2 419 754 and FR-A-2 431, 321. In this case, a helical movement is imparted to the treatment gases (hot gases), and they flow into a vortex sink. The mixture to be dried is injected along a path which coincides with the axis of symmetry of the helical paths of the said gases, which allows the momentum of the gases to be transferred optimally to the mixture to be treated. The gases thus fulfil a twofold function: on the one hand spraying the initial mixture, that is to say converting it into fine droplets, and on the other hand drying the droplets obtained. Furthermore, the extremely short residence time (generally less than about 1/10 of a second) of the particles in the reactor has the advantage, amongst other things, of limiting possible risks of overheating due to excessively long contact with the hot gases.

Depending on the respective flow rates of the gases and of the mixture to be dried, the input temperature of the gases in the flash reactor is between 400 and 900° C., and more particularly between 600 and 800° C., and the temperature of the dried solid between 100 and 250° C., preferably between 125 and 200° C.

After this drying step, a dry product is obtained which may optionally be calcined in the same way as described for the previous methods.

The three methods described above constitute the preferred processes for obtaining cerium and/or zirconium/manganese compositions in the form of solid solutions in the sense of the word given above.

According to a fourth method, a composition which can be used for the invention may be prepared by impregnating a cerium and/or zirconium oxide or a precursor of this oxide with a solution of a manganese compound then by calcining the impregnated oxide.

The impregnation is carried out by mixing the oxide to be impregnated, or its precursor, and a solution of a manganese compound selected from compounds which can be thermally decomposed into an oxide.

The salts of organic or inorganic acids, such as nitrates, chlorides, sulphates and acetates, for example, may be mentioned as suitable manganese compounds. Nitrates constitute the preferred compounds.

It is, in particular, possible to impregnate the oxide by soaking it in the solution of the manganese compound and to remove the excess solution by draining it or by passing it through a rotary evaporator.

According to a preferred variant of this fourth process, the impregnation is carried out "dry", that is to say the total volume of solution used is approximately equal to the total pore volume developed by the oxide to be impregnated. As regards the determination of this pore volume, this may be done using the known mercury porosity meter method or alternatively by measuring the quantity of water absorbed by a sample.

In a second step, the impregnated oxide is dried to remove the water, thus leaving the manganese compound in a form which is dispersed homogeneously and intimately in, or on the surface of, the oxide.

The drying is most often carried out in air, at a temperature which may vary between 80 and 300° C. and is preferably selected to be between 100 and 150° C. The drying is continued until a constant weight is obtained. Generally, the drying lasts between 1 and 24 hours.

Finally, in a third step, the impregnated oxide is calcined under the same conditions as those described above.

In the case when a composition comprising an additional element of the aforementioned type is used, this composition may be prepared by using one of the processes described above. Instead of employing only a manganese compound, use is furthermore made of a compound of the aforementioned element or elements, and the description given above as regards the nature of the manganese compound and the order in which it is introduced into these processes also applies to the compounds of the aforementioned elements.

It will be noted that, in the case of a process for the preparation by impregnation of a composition comprising manganese and at least one other element, the impregnation may be carried out in two stages. Thus, the cerium and/or zirconium is impregnated with the manganese, then dried, and finally the dried product is impregnated with the element. A reverse order of impregnation may be adopted. It is also possible to adopt the procedure of simultaneously impregnating with the manganese and the other element.

The gases which can be treated using the present invention are, for example, those produced by gas turbines, boilers of thermal power stations, or internal-combustion engines, in particular diesel engines or lean-burn engines.

The invention applies to the treatment of gases which have a high oxygen content and which contain nitrogen oxides, with a view to controlling the emissions of these oxides. The term "gases having a high oxygen content" is intented to mean gases which continuously have an excess of oxygen relative to the stoichiometric value $\lambda=1$. The $\lambda$ value is correlated with the air/fuel ratio in a manner which is known per se, in particular in the field of internal-combustion engines. In other words, the invention applies to the treatment of gases produced by systems which are of the type described in the previous paragraph and which continuously operate under conditions such that $\lambda$ is always strictly greater than 1. The invention thus applies to the treatment of gases which have an oxygen content (expressed in terms of volume) of at least 5%, more particularly at least 10%, it being possible, for example, for this content to be between 5 and 20%.

The gases may contain hydrocarbons, and in such a case, one of the reactions which it is desired to catalyse is the reaction HC (hydrocarbons)+$NO_x$.

Hydrocarbons which can be used as a reducing agent for the elimination of NOx are, in particular, gases or liquids from the saturated hydrocarbon, ethylenic hydrocarbon, acetylenic hydrocarbon and aromatic hydrocarbon families, and hydrocarbons from petroleum cuts such as, for example, methane, ethane, propane, butane, pentane, hexane, ethylene, propylene, acetylene, butadiene, benzene, toluene, xylene, kerosene and gas oil.

The gases may also contain oxygen-containing organic compounds as reducing agent. These compounds may, in particularly, be alcohols, for example of the saturated alcohol type, such as methanol, ethanol or propanol; ethers such as methyl ether or ethyl ether; esters such as methyl acetate; and ketones.

It should be noted, however, that according to an advantageous characteristic of the invention, the treatment process may be carried out on a gas in the presence of a hydrocarbon.

The invention also relates to a catalytic system for the treatment of gases with high oxygen content, with the view to controlling nitrogen oxide emissions, which is characterized in that it comprises a catalytic composition of the type described above.

In this system, after having been mixed with a support, for example of the alumina or silica type, the catalytic composition may be in various forms such as granulates, pellets, cylinders or honeycombs of variable dimensions.

The compositions can also be used in catalytic systems comprising a washcost based on a support of the same type as above and on these compositions, of a substrate of, for example, metallic or ceramic monolith type.

Other embodiments of catalytic systems incorporating the compositions of the invention may be envisaged.

Thus, according to a first embodiment, the system includes, arranged upstream in the gas flow direction, a first element comprising a substrate of the metallic or ceramic monolith type, which has a catalytic washcost based on a support such as alumina or silica and on at least one precious metal which may, for example, be platinum, palladium, rhodium or iridium. Furthermore, the system includes a second element, downstream of the first, comprising the aforementioned catalytic composition. This second element may be in any form of the type described above, for example in the form of pellets or a monolith.

According to another embodiment of the invention, the catalytic system may consist of a substrate with a catalytic washcost comprising either a first layer incorporating the catalytic composition of the invention and a second layer incorporating at least one precious metal of the type indicated in the description of the embodiment described previously, or a single layer comprising a mixture of the catalytic composition and at least one precious metal.

Finally, according to another embodiment, the catalytic system may be in the form of a mixture of the aforementioned catalytic composition on a first support and of at least one precious metal on a second support, it being possible for the supports to be identical or different. For example, the mixture may be a mixture of pellets or granulates based on alumina or silica, of which some support the precious metal and the others support the composition according to the invention.

The systems are fitted, in known fashion, in the exhaust pipes of vehicles, in the case of application to the treatment of exhaust gases.

Finally, the invention also relates to the process for the preparation of the aforementioned catalytic systems, by employing a catalytic composition of the type described above.

Examples will now be given.

In the examples given below, the products obtained are tested in two different ways to evaluate their catalytic performance.

The first method corresponds to an evaluation under low hourly space velocity conditions (ratio of the flow rate in standard 1/h to the volume of catalyst in 1).

In this case, 0.3 g of the catalyst in powder form is introduced into a quartz reactor. Before this, the powder used has been compacted then ground and screened so as to isolate the particle-size fraction between 0.125 and 0.250 mm.

At the inlet of the reactor, the reaction mixture has the following composition (expressed in terms of volume):

—NO=300 vpm

—$C_3H_6$=300 vpm

—CO=350 vpm

—$O_2$=10%

—$CO_2$=10%

—$H_2O$=10%

—$N_2$=qs 100%

The overall flow rate is 10 standard 1/h.

The hourly space velocity is of the order of 20,000 $h^{-1}$.

The HC ($C_3H_6$), CO, $N_2O$, NO and $NO_x$ ($NO_x$=NO+$NO_2$) signals are recorded continuously, as is the temperature in the reactor.

The HC signal is given by a Beckman total HC detector, based on the principle of flame ionization detection.

The NO and $NO_x$ signals are given by an Ecophysics $NO_x$ analyzer, based on the principle of chemiluminescence; it gives the NO, $NO_x$ and $NO_2$ values, the latter being calculated by the difference between the $NO_x$ and NO signals.

The CO and $N_2O$ signals are given by Rosemount infrared analysers.

The catalytic activity is measured on the basis of the HC, NO, $N_2O$ and $NO_x$ signals as a function of temperature during a programmed temperature rise from 150 to 7500° C. at a rate of 15° C./min, and on the basis of the following equations:

The NO (TNO) degree of conversion in %, which is given by:

T(NO)=100(NO°−NO)/NO°, with NO° being the NO signal at time t=0 which corresponds to the NO signal obtained with the reaction mixture when the catalytic reactor is bypassed, and NO being the NO signal at time t.

The HC (THC) degree of conversion in %, which is given by:

T(HC)=100(HC°−HC)/HC°, with HC° being the HC signal at time t=0 which corresponds to the HC signal obtained with the reaction mixture when the catalytic reactor is bypassed, and HC being the HC signal at time t.

The $NO_x$ (T$NO_x$) degree of conversion in %, which is given by:

T($NO_x$)=100($NO_x$°−$NO_x$)/$NO_x$°, with $NO_x$° being the $NO_x$ signal at time t=0 which corresponds to the $NO_x$ signal obtained with the reaction mixture when the catalytic reactor is bypassed, and $NO_x$ being the $NO_x$ signal at time t.

The $NO_x$ into $N_2O$ degree of conversion (T$N_2O$) in %, which is given by:

T($N_2O$=200($N_2O$−$N_2O$°)/$NO_x$°, with $N_2O$° being the $N_2O$ signal at time t=0 which corresponds to the $N_2O$ signal obtained with the reaction mixture when the catalytic reactor is bypassed, and $N_2O$ being the $N_2O$ signal at time t.

The second way of testing the products corresponds to an evaluation at higher hourly space velocities, since the mass of catalyst is only 50 mg and the total flow rate in the catalytic reactor is 30 standard l/h. The hourly space velocity under these conditions is of the order of 500,000 $h^{-1}$. The composition of the reaction mixture is the same as before.

EXAMPLES

I—Synthesis of the Catalysts

Starting materials:

The starting materials used are copper nitrate ($Cu(NO_3)_2 \cdot 3H_2O$), manganese nitrate ($Mn(NO_3)_2 \cdot 4H_2O$), bismuth nitrate ($Bi(NO_3)_3 \cdot 5H_2O$), antimony tartrate ($Sb_2(C_4H_4O_6)_3 \cdot 6H_2O$), platinum ($Pt(H_2NH_2CH_2NH_2)_2Cl_2$) in solution and a tin sol.

The tin sol is prepared by adding an $NH_4OH$ solution (1.70 mol/l) to an equal volume of a tin chloride solution ($SnCl_4$ 0.50 mol/l). After several washes using an ammoniacal buffer at the precipitation pH (close to 8.7) in order to remove the chlorides, the precipitate is prepared by centrifuging and resuspended in water to form a sol.

The supports used are cerium oxide $CeO_2$ (Rhone-Poulenc), and cerium-zirconium oxide (30% $ZrO_2$ by weight) (Rhone-Poulenc) and a mixed cerium-manganese oxide (10% $MnO_2$ by weight) (Rhone-Poulenc), both being obtained by the first preparation method described above.

Synthesis:

Two techniques were used.

The first technique is dry impregnation. It consists in impregnating the support in question with the active element dissolved in a solution whose volume is equal to the pore volume of the support (determined using water: 0.35 $cm^3$/g in the case of $CeO_2$, and 0.44 $cm^3$/g in the case of $CeO_2$—$Mn_2O_3$ and $CeO_2$—$ZrO_2$) and whose concentration makes it possible to achieve the desired doping.

The operating protocol is as follows:

Dry impregnation with the first element

Stove drying (110° C., 2 h)

Dry impregnation with the second element (optional)

Stove drying (110° C., 2 h)

Calcining at 750° C., for 2 h, rise at 5° C./min.

The products were characterized by X-ray diffraction and their specific surface was determined by single-point BET measurement.

The second technique is spraying. The mixture comprising the constituent elements of the composition is sprayed under the following conditions:

Oxide concentration of the reactants: 150 g/l

Entry temperature: 240° C.

Exit temperature: 120° C.

Calcination at 750° C. for 2 h, rise at 5° C./min.

Products obtained

With a $CeO_2$ support:

Product 1: [Mn]=10 atom % (i.e. [Mn]/([Mn]+[$CeO_2$])=0.01), prepared by impregnation and calcination at 750° C., BET surface area=50 $m^2$/g Product 2: [Mn]=5 atom % and [Sn]=5 atom % (i.e. [Mn]+[Sn]/([Mn]+[Sn]+[$CeO_2$])=0.10), prepared by impregnation and calcination at 750° C., BET surface area=61 $m^2$/g Product 3: as product 2, but with Sb instead of Sn and with the same concentration, BET surface area=39 $m^2$/g.

Product 4: as product 2, but with Bi instead of Sn and with the same concentration, BET surface area=40 $m^2$/g.

With a $CeO_2$—$Mn_2O_3$ support:

Product 5: support as is, calcination at 750° C., BET surface area=17 m$^2$/g

Product 6: [Cu]=5 atom % (i.e. [Cu]/([Cu]+[$CeO_2$])= 0.05), calcination at 750° C., BET surface area=12 m$^2$/g Product 7: [Pt]=0.8 atom % (i.e. [Pt]/([Pt]+[$CeO_2$])= 0.008), calcination at 750° C., SBET=13 m$^2$/g With a $CeO_2$—$ZrO_2$ support Product 8: [Mn]=10 atom %, BET surface area=48 m$^2$/g With a $ZrO_2$ support Product 9: [Mn]=10 atom %, obtained by co-drying a zirconium sol and manganese nitrate, BET surface area=23 m$^2$/g.

II—Catalytic Performance

Example No. 1 (Comparative)

The performance of the comparative catalyst based on $CeO_2$ alone is given in Tables I and II.

TABLE I

| | Catalytic activity of the catalyst at low hourly space velocity | | | |
|---|---|---|---|---|
| Temperature (° C.) | THC (%) | TNO (%) | TNOx (%) | TN$_2$O (%) |
| 150 | 0 | 0 | 0.2 | 0 |
| 200 | 0.9 | 0 | 1 | 0 |
| 250 | 1.2 | 0 | 0 | 0 |
| 300 | 1.4 | 15.7 | 0 | 0 |
| 350 | 4.2 | 47.9 | 0 | 0 |
| 400 | 20.7 | 0 | 0 | 0 |
| 450 | 77.8 | 0 | 0 | 0 |
| 500 | 98.6 | 0 | 0 | 0 |
| 550 | 100 | 0 | 0 | 0 |
| 600 | 100 | 0 | 0 | 0 |
| 650 | 100 | 0 | 0 | 0 |
| 700 | 100 | 0 | 0 | 0 |

TABLE II

| | Catalytic activity of the catalyst at high hourly space velocity | | | |
|---|---|---|---|---|
| Temperature (° C.) | THC (%) | TNO (%) | TNOx (%) | TN$_2$O (%) |
| 200 | 0 | 0.1 | 0 | 0 |
| 250 | 0 | 2.0 | 0 | 0 |
| 300 | 0 | 13.4 | 0 | 0 |
| 350 | 0.1 | 16.3 | 0 | 0 |
| 400 | 4.8 | 14.8 | 0 | 0 |
| 450 | 22.7 | 11.9 | 0 | 0 |
| 500 | 56.2 | 11.0 | 0 | 0 |
| 550 | 82.0 | 8.9 | 0 | 0 |
| 600 | 93.7 | 6.4 | 0 | 0 |
| 650 | 97.4 | 4.2 | 0 | 0 |
| 700 | 99.9 | 2.8 | 0 | 0 |

It is seen that, under both the low hourly space velocity conditions and under the high hourly space velocity conditions, the catalytic activity with respect to the $NO_x$ emission control is zero. The catalyst has activity only with respect to the oxidation of NO into $NO_2$.

Example No. 2

The performance of product 1 is given in Tables III and IV.

TABLE III

| | Catalytic activity of product 1 at low hourly space velocity | | | |
|---|---|---|---|---|
| Temperature (° C.) | THC (%) | TNO (%) | TNOx (%) | TN$_2$O (%) |
| 200 | 17.1 | 0 | 0 | 0 |
| 250 | 88.5 | 0.6 | 0 | 0 |
| 300 | 100 | 73.4 | 47.6 | 0 |
| 350 | 100 | 44.1 | 0 | 0 |
| 400 | 100 | 18.3 | 0 | 0 |
| 450 | 100 | 0.6 | 0 | 0 |
| 500 | 100 | 2.9 | 0 | 0 |
| 550 | 100 | 4.6 | 0 | 0 |
| 600 | 100 | 1.7 | 0 | 0 |
| 650 | 100 | 0 | 0 | 0 |
| 700 | 100 | 0 | 0 | 0 |

TABLE IV

| | Catalytic activity of product 1 at high hourly space velocity | | | |
|---|---|---|---|---|
| Temperature (° C.) | THC (%) | TNO (%) | TNOx (%) | TN$_2$O (%) |
| 200 | 0.8 | 0 | 0 | 0 |
| 250 | 13.7 | 0 | 0 | 0 |
| 300 | 62.5 | 0.3 | 0 | 0 |
| 350 | 95.3 | 26.9 | 14.1 | 0 |
| 400 | 99.8 | 44.1 | 22.1 | 0 |
| 450 | 100 | 31.1 | 13.3 | 0 |
| 500 | 100 | 19.1 | 6.2 | 0 |
| 550 | 100 | 11.2 | 2.6 | 0 |
| 600 | 100 | 5 | 0 | 0 |
| 650 | 100 | 2.6 | 0 | 0 |
| 700 | 100 | 0.3 | 0 | 0 |

A high DeNO$_x$ activity is seen under the low hourly space velocity conditions. The presence of $N_2O$ is not detected.

Under the high hourly space velocity conditions, $N_2O$ is not detected.

Example No. 3

The performance of product 5 is given in Table V.

TABLE V

| | Catalytic activity of product 5 under high hourly space velocity conditions | | | |
|---|---|---|---|---|
| Temperature (° C.) | THC (%) | TNO (%) | TNOx (%) | TN$_2$O (%) |
| 150 | 0.1 | 0.2 | 0.1 | 0 |
| 200 | 2.0 | 6.6 | 3.9 | 0 |
| 250 | 14.4 | 0 | 0 | 0 |
| 300 | 63.3 | 0.4 | 1.5 | 0 |
| 350 | 95.4 | 21.6 | 12.6 | 0 |
| 400 | 99.8 | 37.8 | 20.4 | 0 |
| 450 | 100 | 29.0 | 15.9 | 0 |
| 500 | 100 | 18.1 | 8.6 | 0 |
| 550 | 100 | 11.3 | 4.7 | 0 |
| 600 | 100 | 7.1 | 2.9 | 0 |
| 650 | 100 | 5.2 | 2.1 | 0 |
| 700 | 100 | 3.4 | 1.6 | 0 |

This shows a maximum $NO_x$ conversion of 23% at 395° C. under the high hourly space velocity conditions. $N_2O$ is not detected.

Example No. 4

The performance of product 2 is given in Tables VI and VII.

TABLE VI

Catalytic activity of product 2 under low hourly space velocity conditions

| Temperature (° C.) | THC (%) | TNO (%) | TNOx (%) | TN$_2$O (%) |
|---|---|---|---|---|
| 150 | 0.1 | 0 | 0 | 0 |
| 200 | 8.1 | 0 | 0 | 0 |
| 250 | 66.7 | 7.7 | 0.5 | 0 |
| 300 | 99.2 | 85.1 | 78.8 | 0 |
| 350 | 100 | 62.3 | 15.3 | 0 |
| 400 | 100 | 19.2 | 0 | 0 |
| 450 | 100 | 0 | 0 | 0 |
| 500 | 100 | 0 | 0 | 0 |
| 550 | 100 | 4.5 | 0 | 0 |
| 600 | 100 | 3.5 | 0 | 0 |
| 650 | 100 | 2.7 | 0 | 0 |
| 700 | 100 | 0.8 | 0 | 0 |

TABLE VII

Catalytic activity of product 2 under high hourly space velocity conditions

| Temperature (° C.) | THC (%) | TNO (%) | TNOx (%) | TN$_2$O (%) |
|---|---|---|---|---|
| 150 | 0 | 0.3 | 0 | 0 |
| 200 | 0.1 | 5.4 | 1.5 | 0 |
| 250 | 8.8 | 3.5 | 2.0 | 0 |
| 300 | 44.3 | 1.6 | 0.3 | 0 |
| 350 | 86.4 | 17.6 | 9.2 | 0 |
| 400 | 98.4 | 36.2 | 19.6 | 0 |
| 450 | 100 | 27.8 | 12.7 | 0 |
| 500 | 100 | 15.6 | 5.2 | 0 |
| 550 | 100 | 8.9 | 2.0 | 0 |
| 600 | 100 | 3.9 | 0 | 0 |
| 650 | 100 | 2.4 | 0 | 0 |
| 700 | 100 | 0.8 | 0 | 0 |

This shows that, under the low hourly space velocity conditions (Table VI), the catalyst has very high reactivity with respect to the NO$_x$ emission control with a maximum conversion of 80% in a temperature range lying between 250 and 360° C. N$_2$O is not detected at the outlet of the reactor.

Under the high hourly space velocity conditions (Table VII), the catalyst has a maximum activity with respect to the conversion of NO$_x$ of 19% at 390° C. N$_2$O is not produced.

Example No. 5

The performance of product 7 is given in Tables VIII and IX.

TABLE VIII

Catalytic activity of product 7 under low hourly space velocity conditions

| Temperature (° C.) | THC (%) | TNO (%) | TNOx (%) | TN$_2$O (%) |
|---|---|---|---|---|
| 150 | 3.0 | 0 | 0 | 0 |
| 200 | 51.8 | 0 | 0 | 3.3 |
| 250 | 98.6 | 74.6 | 67.2 | 8.6 |
| 300 | 100 | 79.7 | 40.0 | 5.6 |
| 350 | 100 | 65.6 | 21.2 | 1.8 |

TABLE VIII-continued

Catalytic activity of product 7 under low hourly space velocity conditions

| Temperature (° C.) | THC (%) | TNO (%) | TNOx (%) | TN$_2$O (%) |
|---|---|---|---|---|
| 400 | 100 | 44.4 | 7.9 | 0 |
| 450 | 100 | 29.3 | 3.3 | 0 |
| 500 | 100 | 18.6 | 0.6 | 0 |
| 550 | 100 | 11.9 | 0 | 0 |
| 600 | 100 | 5.2 | 0 | 0 |
| 650 | 100 | 2.7 | 0 | 0 |
| 700 | 100 | 0 | 0 | 0 |

TABLE IX

Catalytic activity of product 7 under high hourly space velocity conditions

| Temperature (° C.) | THC (%) | TNO (%) | TNOx (%) | TN$_2$O (%) |
|---|---|---|---|---|
| 200 | 1.0 | 0 | 0 | 0 |
| 250 | 5.9 | 0 | 0 | 0.3 |
| 300 | 78.7 | 12.9 | 13.4 | 7.6 |
| 350 | 98.9 | 22.3 | 15.0 | 5.3 |
| 400 | 100 | 38.8 | 21.7 | 1.2 |
| 450 | 100 | 31.4 | 16.6 | 0.3 |
| 500 | 100 | 19.6 | 7.9 | 0.3 |
| 550 | 100 | 11.3 | 3.1 | 0 |
| 600 | 100 | 5.9 | 0.8 | 0 |
| 650 | 100 | 2.9 | 0.8 | 0 |
| 700 | 100 | 2.7 | 0 | 0 |

This shows, under the low hourly space velocity conditions (Table VIII), a high activity with respect to the conversion of the NO$_x$, with a maximum of 72% conversion at 265° C. The addition of platinum also has an effect on the NO$_x$ conversion range, which is substantially broadened since the activity range is between 200 and 500° C.

Under the high hourly space velocity conditions (Table IX), the activity of the catalyst has two activity ranges: the first with a maximum of 13.4% conversion of NO$_x$ at 300° C. and production of N$_2$O (corresponding to an NO$_x$ degree of conversion of at most 4%), and the second with a maximum NO$_x$ conversion of 23% at 390° C. In this case, there is therefore a conversion range for NO$_x$ which extends between 255 and 600° C. with very low production of N$_2$O between 265 and 400° C.

Example No. 6

The performance of product 6 is given in Tables X and XI.

TABLE X

Catalytic activity of product 6 under low hourly space velocity conditions

| Temperature (° C.) | THC (%) | TNO (%) | TNOx (%) | TN$_2$O (%) |
|---|---|---|---|---|
| 200 | 2.6 | 2.4 | 1.7 | 0 |
| 250 | 48.2 | 6.3 | 6.7 | 0 |
| 300 | 85.6 | 43.0 | 29.1 | 0 |
| 350 | 100 | 61.5 | 23.9 | 0 |
| 400 | 100 | 44.5 | 11.1 | 0 |
| 450 | 100 | 28.6 | 3.3 | 0 |
| 500 | 100 | 17.0 | 0.8 | 0 |
| 550 | 100 | 9.2 | 0 | 0 |

TABLE X-continued

Catalytic activity of product 6 under
low hourly space velocity conditions

| Temperature (° C.) | THC (%) | TNO (%) | TNOx (%) | TN$_2$O (%) |
|---|---|---|---|---|
| 600 | 100 | 3.9 | 0 | 0 |
| 650 | 100 | 0.2 | 0 | 0 |
| 700 | 100 | 0 | 0 | 0 |

TABLE XI

Catalytic activity of product 6 under
high hourly space velocity conditions

| Temperature (° C.) | THC (%) | TNO (%) | TNOx (%) | TN$_2$O (%) |
|---|---|---|---|---|
| 150 | 0 | 0.2 | 0.5 | 0 |
| 200 | 0 | 0 | 0 | 0 |
| 250 | 3.9 | 0 | 0.2 | 0 |
| 300 | 26.6 | 0 | 0.5 | 0 |
| 350 | 66.2 | 4.0 | 3.2 | 0 |
| 400 | 88.7 | 21.6 | 12.9 | 0 |
| 450 | 97.2 | 27.1 | 15.8 | 0 |
| 500 | 99.7 | 20.0 | 10.8 | 0 |
| 550 | 100 | 13.9 | 6.9 | 0 |
| 600 | 100 | 9.2 | 3.5 | 0 |
| 650 | 100 | 5.7 | 1.1 | 0 |
| 700 | 100 | 4.6 | 0.9 | 0 |

This shows, under the low hourly space velocity conditions (Table X), catalytic activity with respect to NO$_x$ starting from 195° C. The activity passes through a maximum of 30% NO$_x$ conversion at 305° C. The activity range is broad (195 to 540° C.). The presence of N$_2$O is not detected at the outlet of the reactor.

Under the high hourly space velocity conditions (Table XI), the catalytic activity with respect to the NO$_x$ conversion passes through a maximum of 18% at 435° C. N$_2$O is not produced.

Example No. 7

Product 5 was tested under the so-called high hourly space velocity conditions while suppressing hydrocarbon and CO in the reaction mixture. An equivalent nitrogen flow rate is substituted in order to make it possible to work under the same overall flow rate conditions.

The performance of the produce under these conditions is given in Table XII.

TABLE XII

Catalytic activity of product 5 under
high hourly space velocity conditions and without
HC or CO in the reaction mixture.

| Temperature (° C.) | TNO (%) | TNOx (%) |
|---|---|---|
| 200 | 6.7 | 3.3 |
| 250 | 15.2 | 8.4 |
| 300 | 29.8 | 15.4 |
| 350 | 45.9 | 23.4 |
| 400 | 52 | 26.8 |
| 450 | 36.6 | 17.6 |
| 500 | 22.5 | 8.8 |
| 550 | 13.7 | 3.5 |
| 600 | 7.7 | 1.3 |
| 650 | 4.1 | 0.6 |
| 700 | 2.2 | 0 |

This shows that, under the high hourly space velocity conditions (Table XII), the catalytic activity with respect to the conversion of NO$_x$ passes through a maximum of 28% at 365° C. N$_2$O is not produced. In the absence of hydrocarbon in the gas phase, the activity of the catalyst with respect to the NO$_x$ emission control is improved.

Example No. 8

The performance of product 3 is given in Table XIII.

TABLE XIII

Catalytic activity of product 3 under high
hourly space velocity conditions

| Temperature (° C.) | THC (%) | TNO (%) | TNOx (%) |
|---|---|---|---|
| 200 | 0.6 | 2.8 | 1.3 |
| 250 | 5.6 | 2 | 1 |
| 300 | 27.3 | 1.2 | 0.4 |
| 350 | 64.7 | 5.2 | 3 |
| 400 | 90.8 | 18.5 | 10.2 |
| 450 | 98.5 | 25.2 | 15.2 |
| 500 | 100 | 20.4 | 11.8 |
| 550 | 100 | 14.6 | 8.2 |
| 600 | 100 | 9.5 | 4.2 |
| 650 | 100 | 6.2 | 1.9 |
| 700 | 100 | 6.5 | 3 |

Example No. 9

The performance of product 4 is given in Table XIV.

TABLE XIV

Catalytic activity of product 4 under
high hourly space velocity conditions

| Temperature (° C.) | THC (%) | TNO (%) | TNOx (%) |
|---|---|---|---|
| 200 | 0 | 9.6 | 3.4 |
| 250 | 0.4 | 17.1 | 8.6 |
| 300 | 2.8 | 20.9 | 9.9 |
| 350 | 7.7 | 26 | 12.1 |
| 400 | 20.6 | 37.1 | 19.2 |
| 450 | 41.2 | 33.2 | 17.6 |
| 500 | 59.4 | 24 | 11.8 |
| 550 | 75.3 | 16.2 | 6.9 |
| 600 | 88.5 | 11.1 | 4.6 |
| 650 | 95 | 8.8 | 2.2 |
| 700 | 99.4 | 6.7 | 1.5 |

Example Nos. 10 to 12

In these examples, products 1, 8 and 9 were tested under the so-called high hourly space velocity conditions, while suppressing hydrocarbon and CO in the reaction mixture. An equivalent nitrogen flow rate is substituted in order to make it possible to work under the same overall flow rate conditions.

TABLE XV

Catalytic activity of product 1

| Temperature (° C.) | TNO (%) | TNOx (%) |
|---|---|---|
| 200 | 9 | 4.6 |
| 250 | 19.1 | 12.2 |
| 300 | 32.7 | 16.8 |
| 350 | 50.8 | 26.2 |
| 400 | 51.7 | 27.6 |
| 450 | 34.9 | 15.4 |
| 500 | 20 | 5.6 |
| 550 | 12.3 | 2.1 |
| 600 | 6.2 | 0.1 |
| 650 | 3.6 | 0 |
| 700 | 2.3 | 0 |

TABLE XVI

Catalytic activity of product 8

| Temperature (° C.) | TNO (%) | TNOx (%) |
|---|---|---|
| 200 | 10.9 | 3.8 |
| 250 | 20.1 | 9.2 |
| 300 | 39.2 | 17.7 |
| 350 | 56.1 | 27.7 |
| 400 | 48.4 | 22 |
| 450 | 31.9 | 11.9 |
| 500 | 18.7 | 4.1 |
| 550 | 10.1 | 0 |
| 600 | 6 | 0 |
| 650 | 1.9 | 0 |
| 700 | 0.3 | 0 |

TABLE XVII

Catalytic activity of product 9

| Temperature (° C.) | TNO (%) | TNOx (%) |
|---|---|---|
| 200 | 2.6 | 1.4 |
| 250 | 9.4 | 5.5 |

TABLE XVII-continued

Catalytic activity of product 9

| Temperature (° C.) | TNO (%) | TNOx (%) |
|---|---|---|
| 300 | 18 | 9.2 |
| 350 | 28.9 | 15.5 |
| 400 | 50.6 | 28.2 |
| 450 | 39.4 | 20.4 |
| 500 | 24.7 | 11.4 |
| 550 | 14.8 | 5.5 |
| 600 | 8.7 | 3.2 |
| 650 | 5.8 | 2.1 |
| 700 | 2.6 | 1.4 |

What is claimed is:

1. A process for the treatment of a gas in order to control nitrogen oxide emissions, comprising the step of treating said gas, said gas having an oxygen content of at least 5% by volume and continuously presenting an excess of oxygen relative to the stoichiometric value $\lambda=1$, with a catalytic composition consisting essentially of manganese oxide deposited on a support made of cerium oxide, zirconium oxide, or a mixture of cerium oxide and zirconium oxide.

2. A process according to claim 1, wherein the oxygen content of at least 10% by volume.

3. A process according to claim 1, wherein the oxygen content is between 5 and 20% by volume.

4. A process according to claim 1, wherein the cerium or zirconium are present with the manganese in the form of a solid solution.

5. A process according to claim 1, wherein the manganese is present in a quantity, expressed as atomic manganese content which respect to the number of moles of cerium oxide and zirconium oxide, of at most 50%.

6. A process according to claim 1, wherein the gas is an exhaust gas of an internal-combustion engine.

7. A process according to claim 1, wherein the internal-combustion engine is a diesel engine or a lean-burn engines.

8. A process according to claim 7, wherein the manganese is present in a quantity, of at most 20%.

* * * * *